United States Patent
Lemar et al.

(10) Patent No.: US 9,940,035 B1
(45) Date of Patent: Apr. 10, 2018

(54) LATENCY OPTIMIZING FOR SCALABLE JOURNALING

(71) Applicant: Igneous Systems, Inc., Seattle, WA (US)

(72) Inventors: Eric Michael Lemar, Seattle, WA (US); Jeffrey Douglas Hughes, Seattle, WA (US); Triantaphyllos Byron Rakitzis, Seattle, WA (US); Kiran V. Bhageshpur, Seattle, WA (US)

(73) Assignee: Igneous Systems, Inc., Seattle, WA (US)

(*) Notice: Subject to any disclaimer, the term of this patent is extended or adjusted under 35 U.S.C. 154(b) by 0 days.

(21) Appl. No.: 15/290,898

(22) Filed: Oct. 11, 2016

(51) Int. Cl.
G06F 12/00 (2006.01)
G06F 3/06 (2006.01)

(52) U.S. Cl.
CPC .......... G06F 3/0611 (2013.01); G06F 3/067 (2013.01); G06F 3/0656 (2013.01)

(58) Field of Classification Search
CPC ....... G06F 3/067; G06F 3/0656; G06F 3/0611
See application file for complete search history.

(56) References Cited

U.S. PATENT DOCUMENTS

| | | | |
|---|---|---|---|
| 6,678,855 B1* | 1/2004 | Gemmell | H03M 13/373 709/231 |
| 7,979,652 B1 | 7/2011 | Sivasubramanian | |
| 8,793,343 B1 | 7/2014 | Sorenson, III et al. | |
| 2008/0040402 A1 | 2/2008 | Judd | |
| 2008/0046644 A1 | 2/2008 | De Spiegeleer | |
| 2008/0243953 A1* | 10/2008 | Wu | G06F 11/1448 |
| 2010/0082547 A1* | 4/2010 | Mace | G06F 11/1435 707/648 |
| 2012/0059934 A1 | 3/2012 | Rafiq et al. | |
| 2015/0019687 A1* | 1/2015 | Aaron | H04L 67/42 709/219 |

OTHER PUBLICATIONS

Official Communication for U.S. Appl. No. 14/811,573 dated Nov. 18, 2015, 17 pages.
Official Communication for U.S. Appl. No. 14/811,573 dated May 27, 2016, 9 pages.

* cited by examiner

*Primary Examiner* — Larry T MacKall
(74) *Attorney, Agent, or Firm* — John W. Branch; Lowe Graham Jones PLLC

(57) ABSTRACT

Embodiments are directed to storing data in a storage system. Data portions may be provided from blocks of write data provided by client computers. A storage location identifier may be associated with each data portion based on the content of the each data portion. Data portions may be stored in a memory buffer that may correspond to the storage location identifiers. If an amount of data stored in the memory buffer exceeds a threshold value, or if a maximum latency time expires, the data portions are stored on a storage location that corresponds to the memory buffer, such that, the maximum latency time is selected to prevent a collision caused by simultaneously storing of data portions in the same storage location. A write acknowledgement message may be provided to the client computers indicating that the blocks of write data are stored to stable storage.

30 Claims, 8 Drawing Sheets

LATENCY OPTIMIZING FOR SCALABLE JOURNALING

TECHNICAL FIELD

This invention relates generally to data storage in a network, and more particularly, but not exclusively, to latency optimization for file systems in a data storage system.

BACKGROUND

The amount of data generated and retained by modern enterprises continues to increase. This explosion in data has led to larger and larger data storage systems. In some cases, these data storage systems may include thousands of storage devices. Unfortunately, as number of storage devices in a storage system increases the probability of storage device failure within a storage system increases as well. Accordingly, storage systems may be arranged to use various error recovery and/or replication schemes to defend against storage device failure. For example, data storage systems may be arranged to employ error/data recovery techniques, such as, erasure coding and/or replication for reducing the risk of data loss. In some environments, a data storage system may employ journaling for recording data writes. In some cases, the same techniques used for providing stable storage of data may impact the performance of journaling systems or other latency sensitive storage operations. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF EMBODIMENTS OF THE INVENTION

Figure 1:
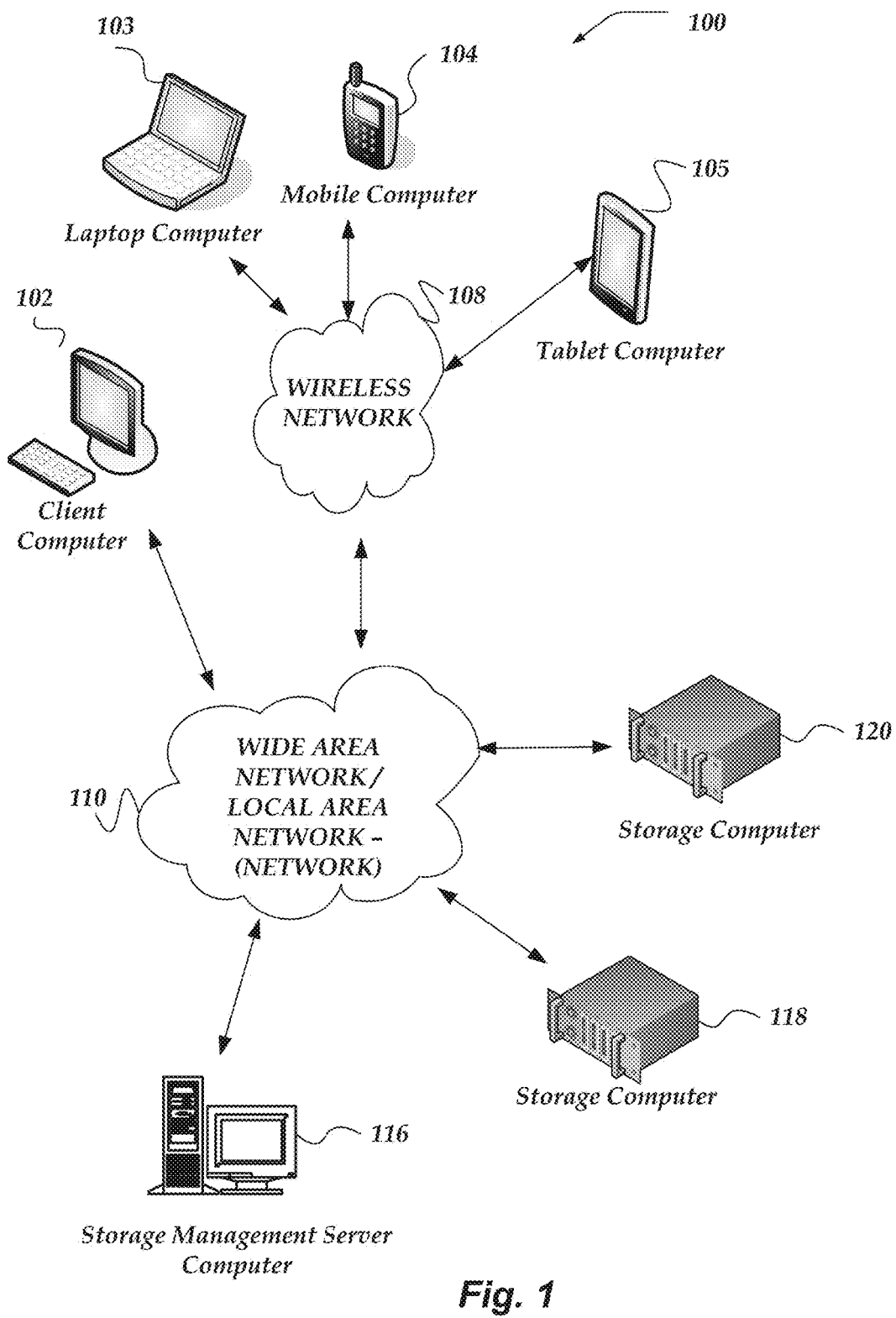
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "storage device" as used herein refers to various apparatus for storing digital information, generally for use by computers. Storage devices may be non-transitory computer readable storage media that may be fixed or removable non-volatile memory systems, such as, magnetic hard drives, magnetic tape, optical drives, solid state drives (SSD), flash memory storage, or the like. Typically, one or more storage devices may be arranged to store information for use in a computer system.

The term "storage computer" as used herein refers to a computer that is arranged to include one or more storage devices. In at least one of the various embodiments, a storage computer may include several storage devices inside a chassis. In other embodiments, the storage devices may be integrated with the storage computer.

The term "storage location" as used herein refers to a storage device, storage computer, or the like, that is used to provide stable storage in a journaling system. Storage locations may be arranged to include multiple storage devices, or storage computers. Also, storage locations that have multiple storage devices or storage computers may be arranged to employ one or more redundancy techniques that may operate independent of the journaling system. Storage locations may also be considered processor readable non-transitory storage media arranged to provide stable storage for a journaling system.

The term "storage location identifier" as used herein refers to a value that may be used to reference and/or identify a particular storage location in a journaling system. In some cases, the storage location identifier is an index or reference to a particular storage location.

The term "CPU complex" as used herein refers to portion of a computer that generally includes, one or more CPU's, cache memory, RAM, I/O components, or the like. Herein, having one or more CPU complexes at least distinguishes a storage computer from a storage device.

As used herein the term "journal records" refers to stored data records that preserve the record of changes made to data. Accordingly, journal records associated with a particular data object may be replayed to generate a version of the data. For example, the current value of a particular data value may be generated by "replaying" the complete set of journal records associated with the particular data value.

The term "erasure coding" as used herein refers to methods for error correction/error recovery based on computing repair symbol information from storage information. The repair symbol information may be computed and stored separately from the storage information and may be employed to correct errors in the storage information that may be caused by data failure. Likewise, if the repair symbol information is lost because of a storage failure, it may be recomputed from the storage information. One of ordinary skill in the art will be familiar with one or more well-known techniques for implementing erasure coding in a computer storage system. One or more well-known erasure coding algorithms may be employed for generating repair symbol information and recovery from data failure, such as, Reed-Solomon coding, XORing, Hamming codes, or the like. Various standard, non-standard, or custom, erasure coding systems may be used, non-limiting examples include, RAID 5 or RAID 6, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to storing data in a storage system over a network using a network computer. In at least one of the various embodiments, a plurality of data portions may be provided from one or more blocks of write data provided by one or more write-client computers. In at least one of the various embodiments, the plurality of data portions exceeds the number of memory buffers that are associated with the storage locations.

In at least one of the various embodiments, a storage location identifier may be associated with each data portion of the plurality of data portions based on at least a content of the each data portions. In at least one of the various embodiments, associating a storage location identifier with each data portion of the plurality of data portions, may include: determining a hash key separately based on one or more portions of each data portion; and determining the storage location identifier based on the hash key and a number of available storage locations.

In at least one of the various embodiments, one or more data portions of the plurality of data portions may be stored in a memory buffer that may correspond to the storage location identifier that may be associated with the one or more data portions.

In at least one of the various embodiments, if an amount of data stored in the memory buffer may exceed a threshold value, or if a maximum latency time may expire, the one or more data portions may be stored on a non-transitory computer readable storage media (e.g., storage locations) that may correspond to the memory buffer, such that, the maximum latency time may be selected to prevent a collision caused by simultaneously storing two or more data portions in the same non-transitory computer readable storage media. In at least one of the various embodiments, storing the one or more data portions in the memory buffer on the non-transitory computer readable storage media, may include, storing the one or more data portions to the non-transitory computer readable storage media in a single write operation.

In at least one of the various embodiments, the two or more data portions in the memory buffer may be from different blocks of write data. In at least one of the various embodiments, the memory buffer and its corresponding non-transitory computer readable storage media may be located on separate network computers.

In at least one of the various embodiments, if the two or more data portions of the plurality of data portions are associated with a same storage location identifier, the two or more data portions may be stored in a single memory buffer that corresponds to the same storage location identifier.

In at least one of the various embodiments, a write acknowledgement message may be provided to the one or more write-client computers, such that the write acknowledgement message may indicate that the one or more blocks of write data may be stored on the non-transitory computer readable storage media (e.g., storage locations).

In at least one of the various embodiments, the memory buffer size threshold value may be determined based on a minimum write block size for the non-transitory computer readable storage media that corresponds to the memory buffer.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Storage Management Server Computer 116, Storage Computer 118, Storage Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, storage management server computer 116, storage computer 118, storage computer 120, or other computers. In some embodiments, the one or more processors of storage management server computer 116 may be arranged to perform one or more specific tasks for storage management as described in detail below.

Client computers 102-105 may further be configured to include a client application that enables an end-user to log into an end-user account that may be managed by another computer, such as storage management server computer 116, storage computer 118, storage computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates storage management server computer 116, storage computer 118, storage computer 120 each as a single computer, the innovations and/or embodiments are not so limited. For example, one or more functions of storage management server computer 116, storage computer 118, storage computer 120, or the like, may be distributed across one or more distinct network computers. Moreover, storage management server computer 116, storage computer 118, storage computer 120 are not limited to a particular configuration such as the one shown in FIG. 1. Thus, in one embodiment, storage management server computer 116, storage computer 118, or storage computer 120 may be implemented using a plurality of network computers. In other embodiments, server computer may operate as a plurality of network computers within a cluster architecture, a peer-to-peer architecture, or the like. Further, in at least one of the various embodiments, storage management server computer 116, storage computer 118, or storage computer 120 may be implemented using one or more cloud instances in one or more cloud networks.

Also, in at least one of the various embodiments, one or more storage management server computers, or at least some or all of the features thereof, may be incorporated in a storage computer, such as, storage computer 118, or storage computer 120. Accordingly, these innovations and embodiments are not to be construed as being limited to a single environment, and other configurations, and architectures are also envisaged.

In at least one of the various embodiments, storage management server computer 116 may represent one or more P-nodes, including a P-node that may be elected to be a data controller. Likewise, in at least one of the various embodiments, storage computer 118 and storage computer 120 may represent L-nodes, including an L-node that may be elected to be a data coordinator.

Illustrative Client Computer

Figure 2:
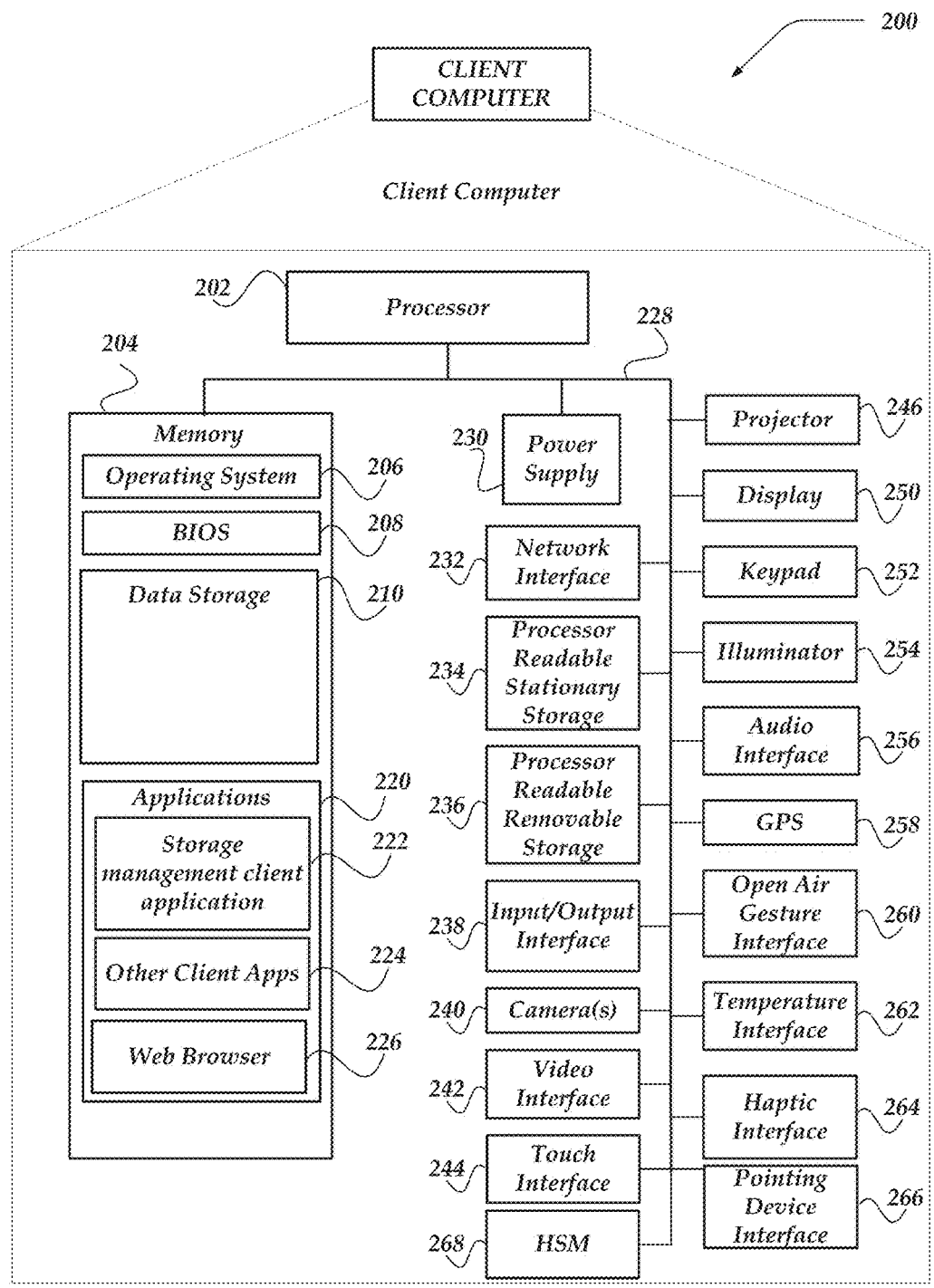
FIG. 2 shows a logical schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, storage management client application 222, other client applications 224, web browser 226, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
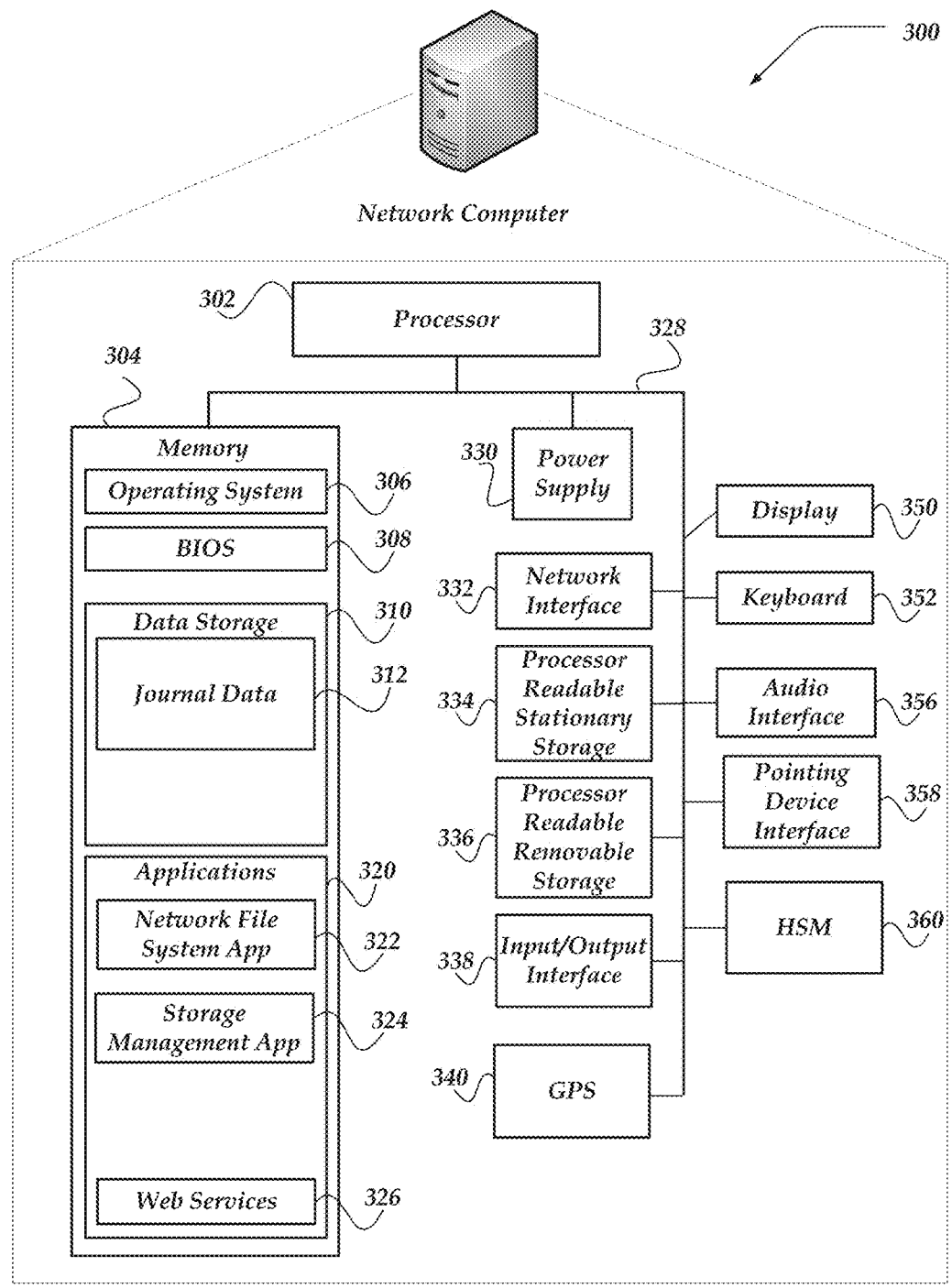
FIG. 3 illustrates a logical schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of storage management server computer 116, and storage computers 118-120 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, journal data 312, or the like. Journal data 312 may be a data store that contains one or more records, logs, events, journaled file system entries, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, web services 326, and so forth. Applications 320 may include network file system application 322, and/or storage management application 324 that perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, network file system application 322, and/or storage management application 324 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to network file system application 322, and/or storage management application 324 may be provisioned and de-commissioned automatically.

Also, in at least one of the various embodiments, network file system application 322, and/or storage management application 324, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In at least one embodiment, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
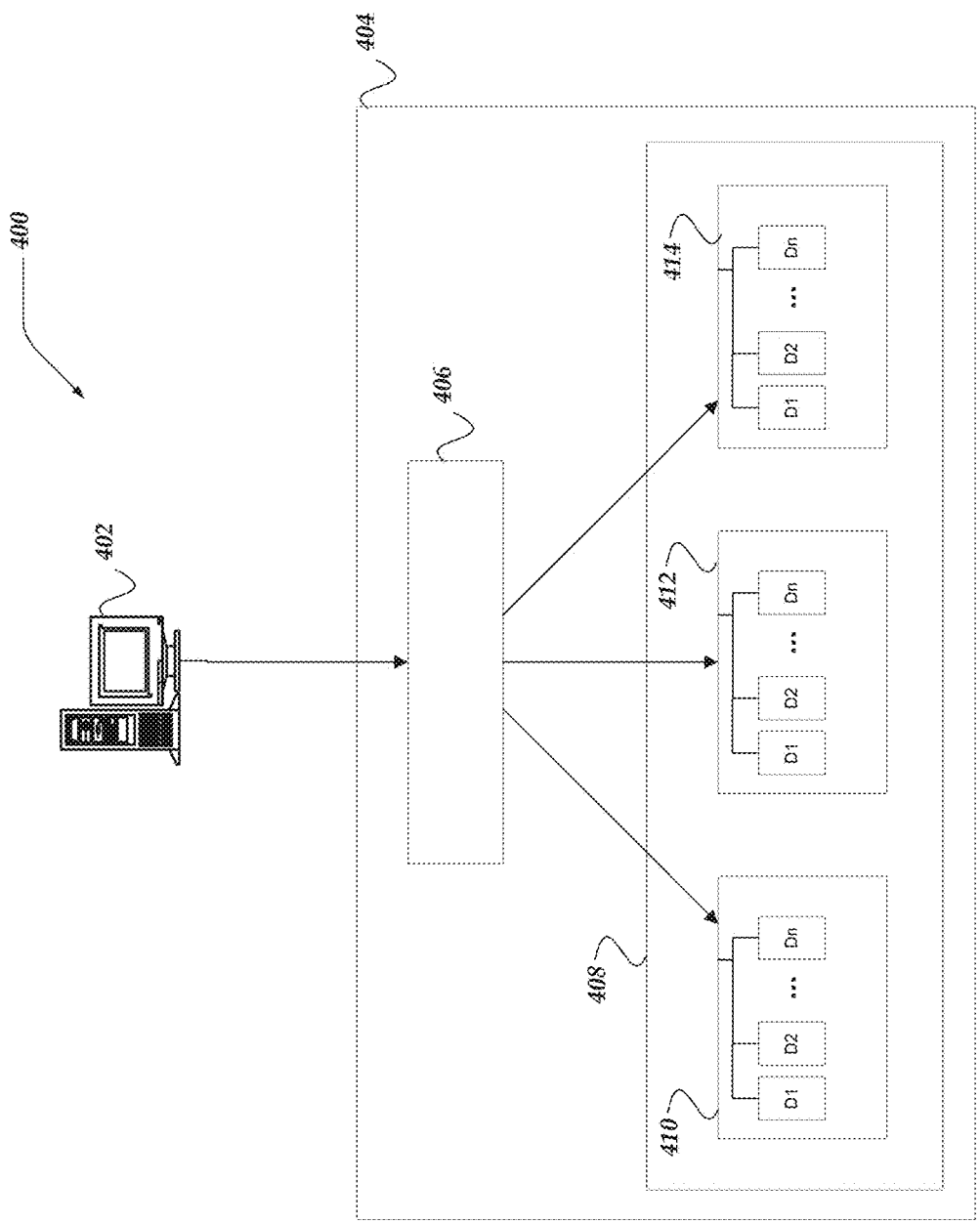
FIG. 4 illustrates a logical schematic of a storage system that is an accordance with at least one of the various embodiments.

FIG. 4 illustrates a logical schematic of storage system 400 that is an accordance with at least one of the various embodiments. In at least one of the various embodiments, storage system 400 may be arranged include one or more client computers or network computers, such as, network computer 402, that may be coupled over a network to a storage platform, such as, storage platform 404. In at least one of the various embodiments, storage platform 404 may include a journaling tier, such as, journaling tier 406 and a capacity tier, such as, capacity tier 408. In at least one of the various embodiments, capacity tier 408 may include one or more storage modules, such as, storage module 410, storage module 412, storage module 414, or the like.

In at least one of the various embodiments, it may be advantageous for storage systems, such as, storage system 400 to be optimized to perform data writes that may be fast and protected against loss. For example, storage systems may be arranged with a define protection levels that represents the number of simultaneous data failures a storage system may experience before data may be irrevocably lost. In at least one of the various embodiments, protection levels may be computed based on the amount of repair symbol information the storage system is storing for each portion of storage data. For example, if a storage system that employs erasure coding has ten hard drives for data storage and two hard drives for storing repair symbol information, under most arrangements the storage system would be considered to have a protection level of two.

In at least one of the various embodiments, a storage system may be arranged to perform several computations, including erasure coding, to transform data provided from a client so it can be safely in the capacity tier of the storage system. In some embodiments, these transformations may include generating and storing various repair symbols that may be used for providing data protection.

In at least one of the various embodiments, going from raw data provided by a client to protected data stored in the capacity tier may cause unacceptable levels of increased and/or unpredictable latency and/or delays when writes are made. Writes that have increased/unpredictable latency may force clients to wait longer to receive an acknowledgment that their write data has reached stable storage.

In at least one of the various embodiments, a journaling tier, such as, journaling tier 406, may be arranged to receive the write data and quickly store it to stable storage that is part of journaling tier 406. For example, if write data from a client comes into storage platform 404, it may be immediately received at journaling tier 406 and stored to stable storage associated with and/or included as part of journaling tier. As soon as the data reaches stable storage in journaling tier 406, the storage platform may provide a write acknowledgment to the client. Later, the storage platform may continue processing the write data to move it to its ultimate destination in the capacity tiers. Generally, as long the latency time for writing data the journaling tiers is less than the latency time for writing data directly to the capacity tier, journaling systems, such as, journaling tier 406 may improve the performance of the overall storage system by reducing write latency.

In at least one of the various embodiments, journaling tiers, such as, journaling tier 406 may comprise several storage locations. Accordingly, in some embodiments, writes may be sharded across two or more of the storage locations. In some embodiments, sharding may be accomplished by using well-known facilities and/or methods to deterministically divide the write data into multiple parts. Then the separate parts of the write data may be written to separate storage locations comprising the journaling tier. In this way, parallelism may be leveraged to increase throughput for writing data to the journaling tier. Accordingly, if the write data is moved from the journaling tier to the capacity tier, the write data may be restored by inverting the method used to shard the data when it was received. In some embodiments, the stable storage in a journaling tier, such as, journaling tier 406, may be organized into two or more storage locations that may include more than one storage device. Accordingly, in some embodiments, the initial sharding of the write data described above, may be arranged to allocate shards of the write data to different storage location of the journaling tier rather writing the entire write data directly to individual storage location.

As mentioned above, the purpose of the journaling tier is too enable incoming write data to be rapidly stored to stable storage (e.g., storage locations of the journaling tier) so an acknowledgement may be sent to the writer clients indicating that their data has been written to stable storage. Subsequent to acknowledging the write, additional actions may be performed on the data by the storage system (e.g., erasure coding) to move it to the capacity tier (if necessary).

Since, in at least one of the various embodiments, clients may wait or block until they receive a write acknowledgment, reducing write latency enables increased client performance. Likewise, in at least one of the various embodiments, improved latency enables a storage system to have the potential to service more clients since any given client write may complete faster. Likewise, in some embodiments, enforcing a maximum latency time provides clients (and the storage system) stability and guaranteed service levels that that may rely on during their operations.

Figure 5:
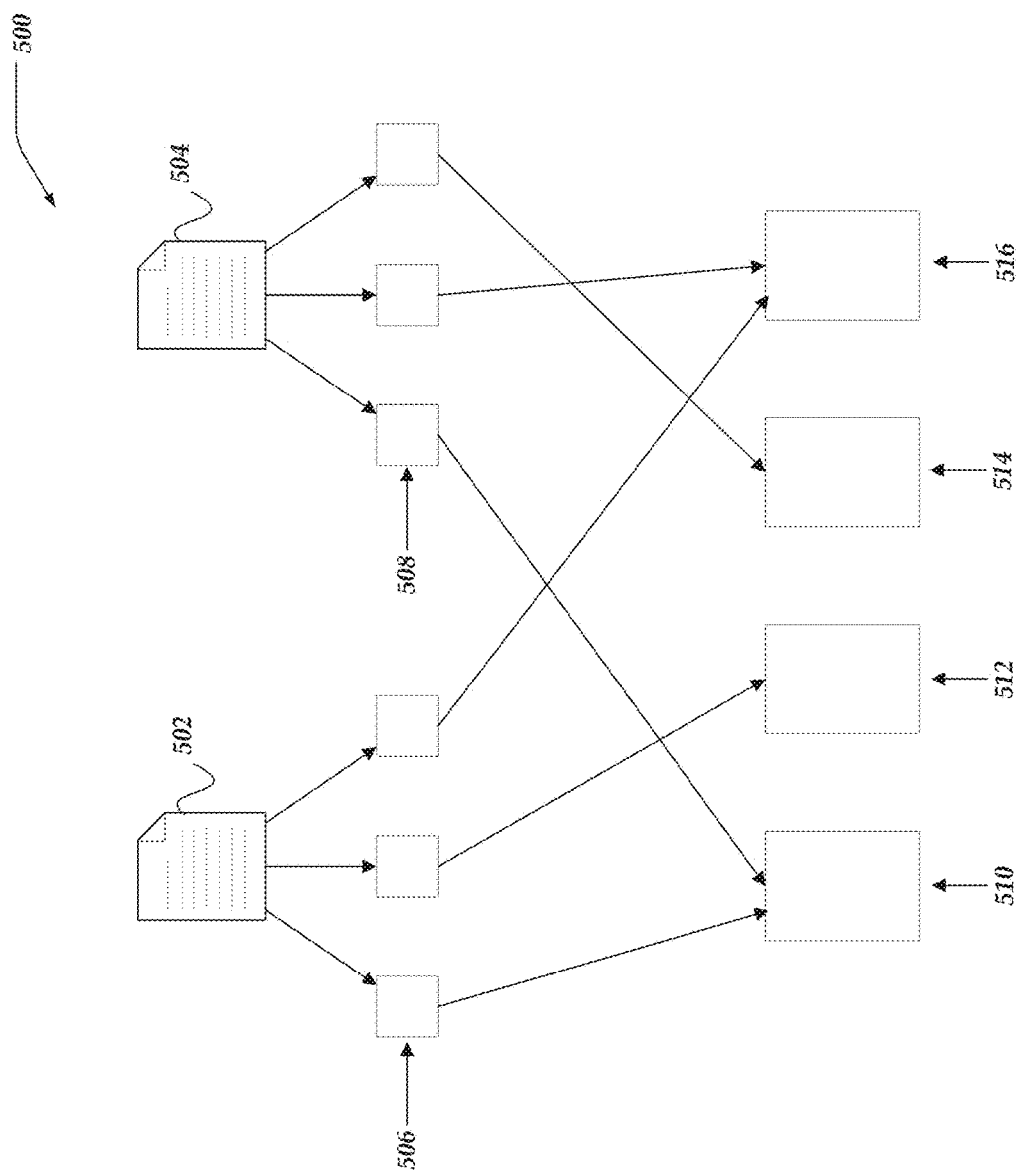
FIG. 5 illustrates a logical schematic of a journaling tier that is an accordance with at least one of the various embodiments.

FIG. 5 illustrates a logical schematic of journaling tier 500 that is an accordance with at least one of the various embodiments. In at least one of the various embodiments, because of parallelism, a journaling tier, such as, journaling tier 500 may receive more than one files to write to a journal. In this example, file 502 and file 504 may be provided to journaling tier 500 for writing. In at least one of the various embodiments, the separate files may be provided to different processes or virtual machines. The files may be temporarily stored in memory or storage considered unstable (e.g., volatile).

In at least one of the various embodiments, files, such as, file 502 and file 504 may be split into multiple parts (e.g., sharding). In some embodiments, a given file may be split into two or more portions of a defined size. A storage location, such as, a storage computer, one or more storage devices, or the like, associated with the journaling tier may be selected for storing each portion of the files in the journaling tier. In some embodiments, a hashing function may be applied to each portion of the file to select a storage location from among a plurality of storage locations that comprise the journaling tier. In at least one of the various embodiments, various hashing functions may be applied to the data to deterministically distribute each data portions to a storage location. The particular hashing function and/or the portion of the files employed by the hashing function may be determined using configuration information, or the like. in at least one of the various embodiments, the selection process may produce a storage location identifier that corresponds to a storage location.

In at least one of the various embodiments, the data portions may be then written in parallel to their respective storage locations. For example, if a journaling tier has four storage locations and a file is divided into four portions, each portion may be written to a separate storage location of the journaling tier. Accordingly, the time it takes to write the entire file to stable storage may be reduced to the amount time to write the four smaller portions to four different devices in parallel. In an ideal case, the time to write (latency) in this example, would be a quarter of the time to write the entire to file to one storage location. This may occur because a given storage location may have a fixed maximum write rate (throughput), so writing the entire file to a single storage location may take four times as long as writing the quarter-sized portions (in this example) to four separate storage locations. Note, there may be other factors that may contribute to write latency, including write block size, file size, data type, data format, or the like, or combination thereof.

In some embodiments, at any given time the number of data portions may exceed the number of storage locations. For example, journaling tier 500 is shown taking two files, file 502 and file 504, and splitting each file into three portions, for a total of six portions. However, in this example, journaling tier 500 has four storage locations, storage location 510, storage location 512, storage location 514, and storage location 516.

Accordingly, in this example, there are six file portions that need to be written to four storage locations. Thus, occasionally, (e.g., more or less randomly depending on the hashing function used for sharding) two or more file portions may be selected for writing to the same storage location. If this happens, except for the first file portion, the latency for writing the file portions to stable storage will be increased. For example, if file portion 506 and file portion 508 are selected to be stored on storage location 510, the second file portion written to storage may be delayed because it has to wait for the first portion to be written first. Further, since the storage locations are selected more or less randomly (e.g., using a hashing function based on the contents of the file portion), this delay in receiving write acknowledgements may also occur randomly. Thus, in some embodiments, the minimum guaranteed latency for journaling tier 500 may be the time it takes to write multiple data portions to stable storage. Because the latency may vary depending on the number of file portions being selected for writing to the same storage location.

In some journaling embodiments, there may be many more data portions than available storage locations. Therefore, while data portion write collisions may be uncommon they may be certain to randomly occur. Accordingly, in at least one of the various embodiments, one or more processors on a network computer may be arranged perform actions to provide an optimized consistent latency guarantee for writer clients.

In at least one of the various embodiments, if two or more data portions are selected to be written to the same storage location within the time period, the two or more data portions are written in one transaction to the storage location at the expiration of the time period. Also, in at least one of the various embodiments, if the maximum size threshold of write data for a storage location is reached, the write data for that storage location may be stored on the storage location. Accordingly, in at least one of the various embodiments, the file/data portions may be buffered in volatile storage before being written to stable storage of a storage location. Thus, in some embodiments, if the volatile storage is lost or the data portions are otherwise disrupted/lost, the writer client will not be provided a write success acknowledgement.

In at least one of the various embodiments, the time period and size threshold may be defined to provide guaranteed latency for writing data, such as, journal entries, or other data types to stable storage to a journaling tier. In at least one of the various embodiments, the time period may be the guaranteed maximum latency for a write and the size threshold may be the maximum buffered amount of data. Accordingly, during writes of files, if the time period elapses or the write size threshold is met, the data portions may be flushed from the buffer to the stable storage of a storage location.

Further, in at least one of the various embodiments, the duration of the time period may be established such that it is long enough to accommodate all potential collisions. For example, if a journaling tier is arranged to accept ten file writes at the same time and each file write is divided into four portions, there will be at most 40 data portions that need to be written to stable storage at any given time. Accordingly, in this example, to avoid collisions, a journaling tier may be include more than 40 storage locations, or alternatively, a journaling tier may include 10 storage locations that and a write size threshold of at least the size of 4 data portions. Also, here the time period duration may be set such that data portions may be written at a regular cycle even if the write size threshold is unmet. In at least one of the various embodiments, the time period may be defined to reduce the number of delayed write acknowledgments. For example, historical/predicated performance metrics may indicate that it may be relatively common for two data portions to collide onto the same storage location while it may be rare for three or more to collide. Accordingly, for this example, the time period may be set to the amount of time required to write data portions to stable storage, recognizing that the chance of three or more data portions be selected for the same storage location may be low. Accordingly, in at least one of the various embodiments, a journaling tier may be configured depending on the needs and policies of the storage system as a whole.

Figure 6:
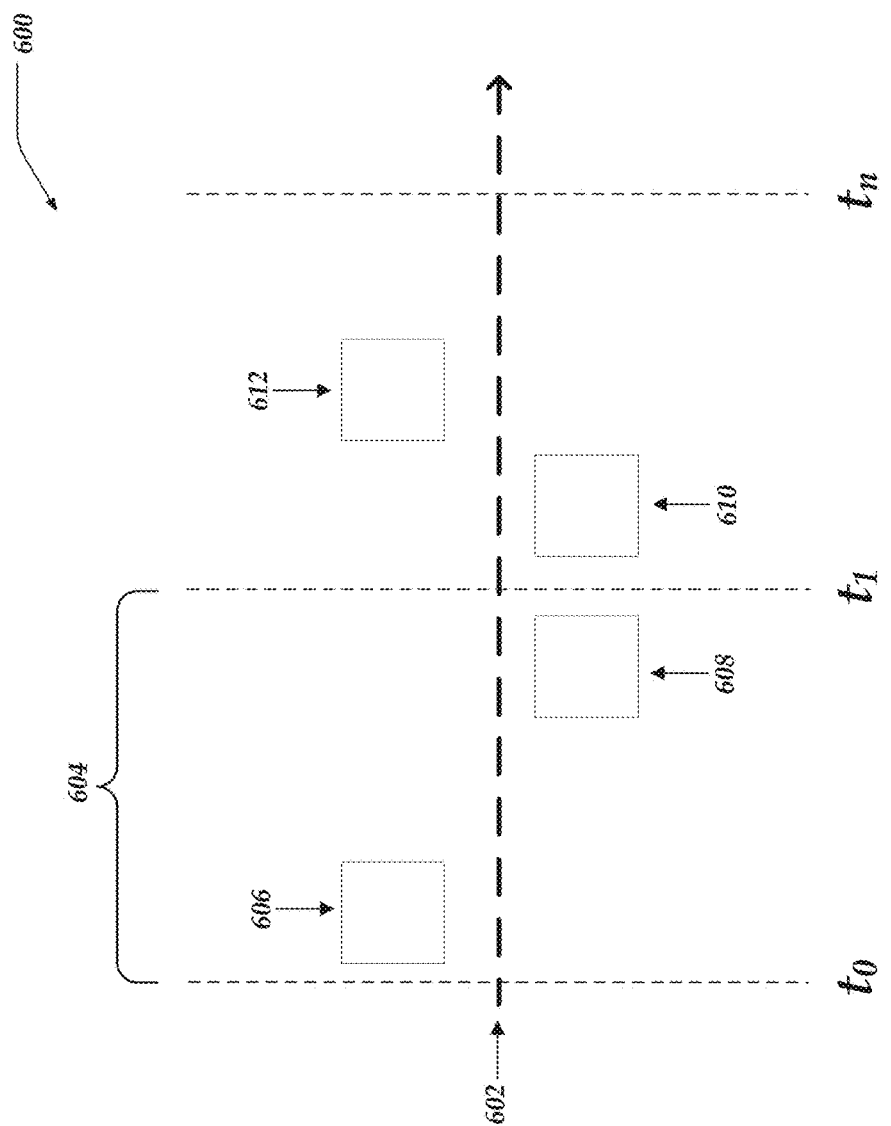
FIG. 6 illustrates a logical timeline for a storage location in a journaling tier that is an accordance with at least one of the various embodiments.

FIG. 6 illustrates logical timeline 600 for a storage location in a journaling tier that is an accordance with at least one of the various embodiments. In at least one of the various embodiments, axis 602 represents the elapsed time during write operations for a storage location that may be associated with a journaling tier. In this example, time period 604 represents the maximum duration to wait between writes to stable storage (e.g., the storage locations). Data portions 606-612 represent data portions of sharded file writes in different stages of the journaling write cycle.

In this example, for at least some embodiments, in the first instance, data portion 606 may be associated with a first file write and data portion 608 may be associated with a second file write. In this example, a sharding algorithm has selected the same storage location for both data portion 606 and data portion 608. This is an example where a hash function has selected the same storage location (e.g., collision) for two or more data portions. In this example, data portion 606 has arrived earlier than data portion 608, so it represented to the left of the data portion 608. As time period 604 expires, data portion 606 and data portion 608 may be written to the same storage location. Further, in this example, later in time, the sharding algorithm has selected the same storage location for both data portion 610 and data portion 612 representing data portions that are also (at a later time) going to be stored on the same storage location. Selecting the same storage location for two or more data portions may be considered a collision.

In at least one of the various embodiments, a time period, such as, time period 604 may represent the maximum latency for writes to a journaling tier. In some embodiments, the maximum latency time may be selected to prevent a collision caused by attempts to simultaneously store two or more data portions in the storage location. Accordingly, in some embodiments, clients may expect their data write to reach stable storage of the storage locations in the journaling tier within the defined time period.

Generalized Operations

Figure 7:
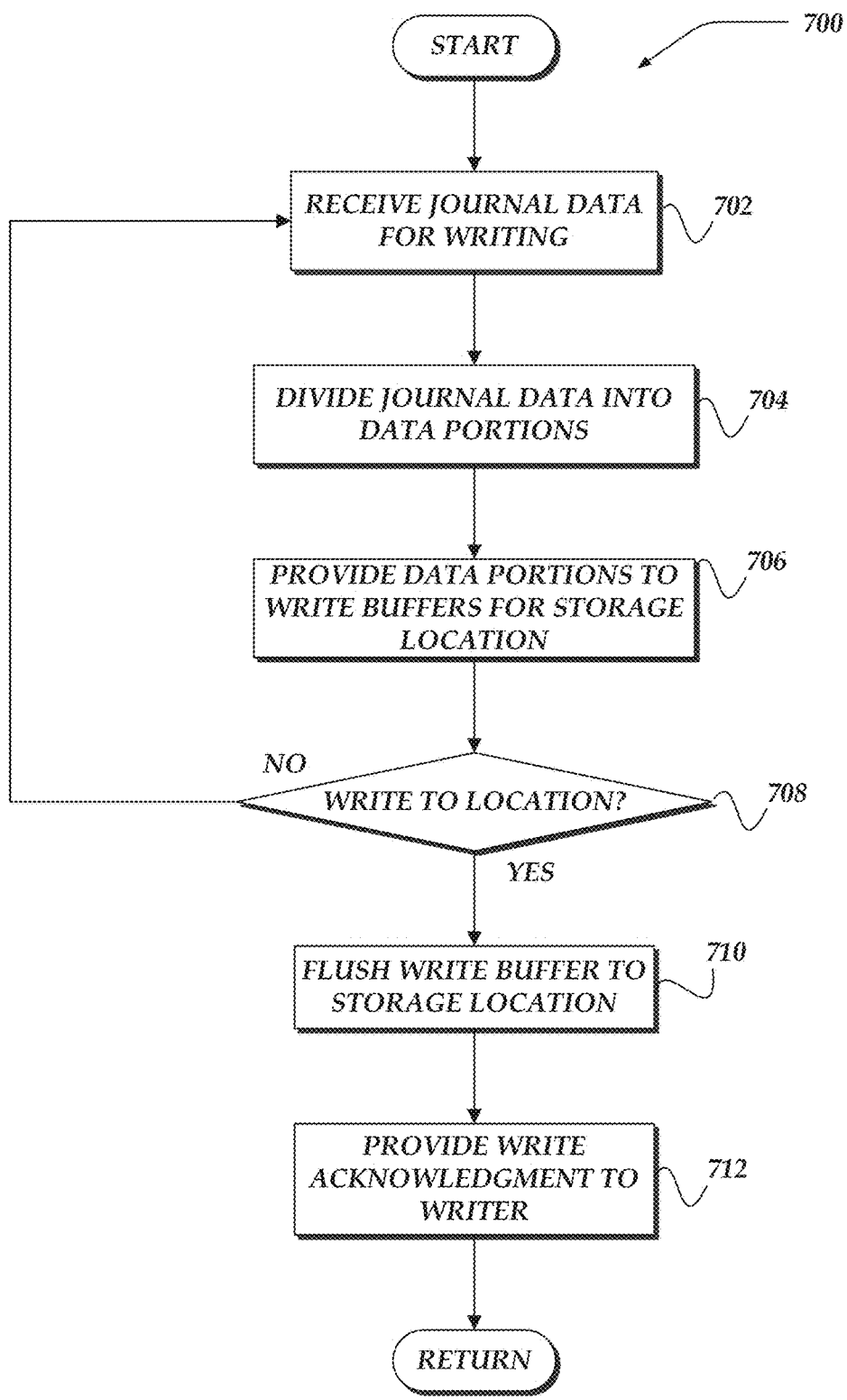
FIG. 7 illustrates an overview flowchart for a process for latency optimizing for scalable journaling in accordance with at least one of the various embodiments.
Figure 8:
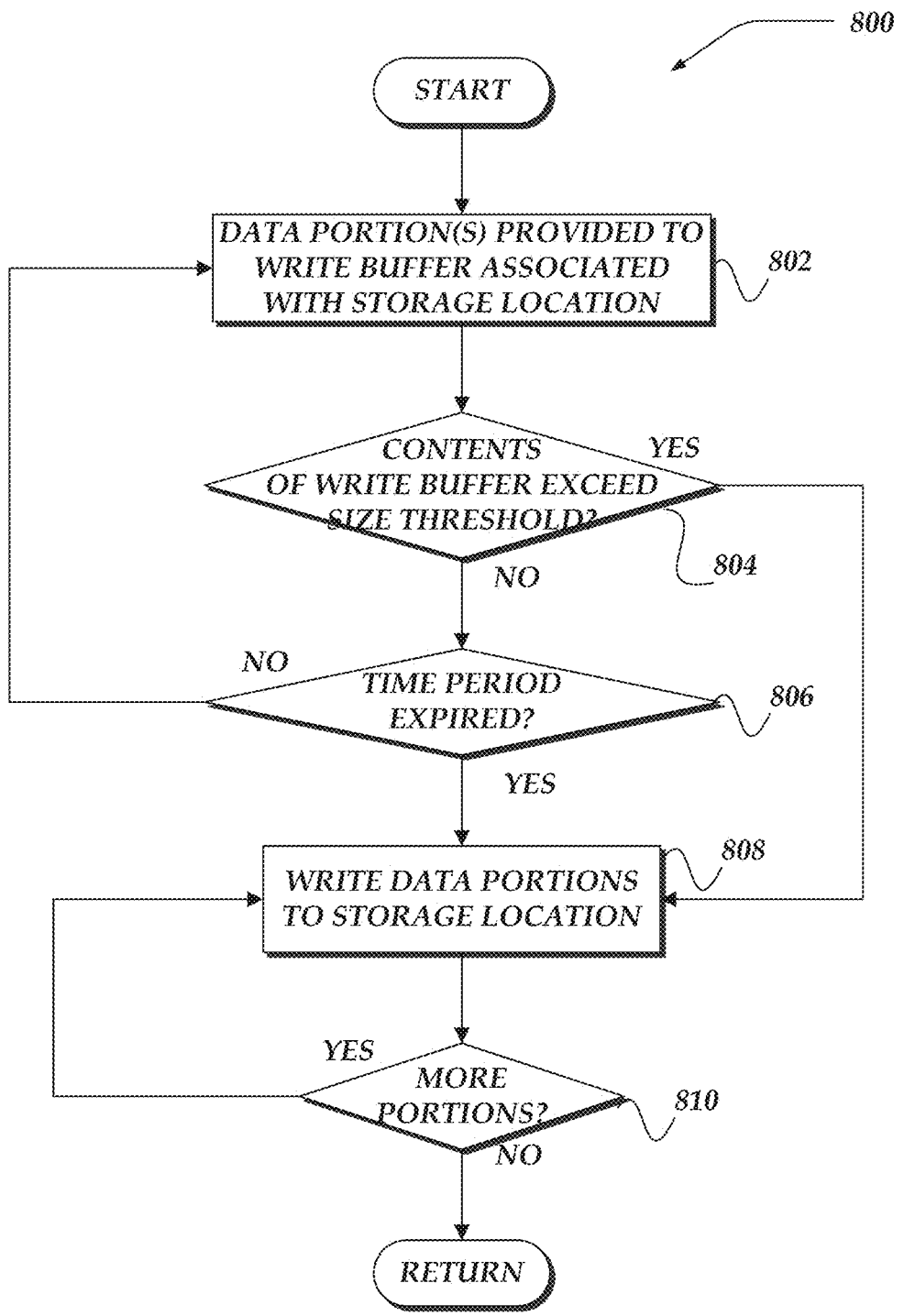
FIG. 8 illustrates an overview flowchart for a process for writing data to storage locations that comprise a journaling system in accordance with at least one of the various embodiments.

FIGS. 7-8 represent the generalized operation for latency optimizing for scalable journaling in accordance with at least one of the various embodiments. In at least one of the various embodiments, processes 700 and 800 described in conjunction with FIGS. 7-8 may be implemented by and/or executed by one or more processors on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 7-8 may be used for latency optimizing for scalable journaling in accordance with at least one of the various embodiments and/or architectures such as those described in conjunction with FIGS. 4-6. Further, in at least one of the various embodiments, some or all of the action performed by processes 700 and 800 may be executed in part by network file system application 322 and/or storage management application 324 running on one or more processors of one or more network computers.

FIG. 7 illustrates an overview flowchart for process 700 for latency optimizing for scalable journaling in accordance with at least one of the various embodiments. After a start block, at block 702, in at least one of the various embodiments, journal data may be received for writing to a journal comprising a journaling system, such as, a journaling tier of a distributed file/storage system.

In at least one of the various embodiments, journal data may be files or portions of files. In some embodiments, journal data may be information that a writer client is attempting to store in a journaled file system. In some embodiments, journal data may be log entries, events, file system updates, database updates, journal records, or the like, or combinations thereof. In at least one of the various embodiments, a writer client may expect journal data to be stored in stable storage before it receives an acknowledgement that the write is complete (e.g., a write acknowledgement).

At block 704, in at least one of the various embodiments, the journal data may be divided into two or more data portions. In at least one of the various embodiments, as described above, one or more processors may execute a sharding algorithm to produce the data portions from the journal data. For example, in some embodiments, a 32 kilobyte block of journal data may be divided in eight 4 kilobyte blocks.

In at least one of the various embodiments, write latency of the journaling system may be improved by increasing the number of the storage locations and splitting the journal data into smaller data portions that may be written in parallel to multiple storage locations.

At block 706, in at least one of the various embodiments, the data portions may be provided to one or more high speed memory buffers that may be associated with two or more storage locations. Each data portion may be written to a buffer that corresponds to one storage location. In at least one of the various embodiments, the particular buffer and/or its corresponding storage location may be determined based on one or more characteristics of a given data portion. For example, in some embodiments, one or more processors may execute a distributive hash function on a portion or the entirety of each data portion to select a destination storage location for each data portion. For example, a hashing function may be arranged to compute a storage location identity value from the contents of a data portion that may be used to determine particular storage location for storing the data portion. For example, in some embodiments, the hash function may produce a key value from one or more meta-data fields, data segments, or the like, from the incoming data. Next, for example, in some embodiments, the key value may be treated as an integer upon which modulo arithmetic may be employed to provide an index to a particular storage location. (E.g., storage location identity=hash(key-data) modulo number-of-storage-devices.) One of ordinary skill in the art will appreciate that other well-known, and/or custom, sharding/distribution algorithms may be employed to provide an index/identity of a storage location based on the data portions provided for writing.

In some embodiments, one or more of the buffers associated with the storage locations may be located in a larger memory store (e.g., a computers main memory) or they may be separate hardware buffers that may be associated with one or more storage locations.

In at least one of the various embodiments, the number of data portions may exceed the number storage locations. Accordingly, in some embodiments, the hashing function may provide the same storage location identity to two or more data portions. If this happens the two or more different data portions may be associated with buffers for the same storage location.

At decision block 708, in at least one of the various embodiments, if the process determines that is time to write the data portions to the storage locations, control may flow to block 710; otherwise, control may loop back to block 702. As described above, a journaling system may be arranged to have a defined time out period and/or time duration. In some embodiments, the particular time period may be defined using configuration information, policy rules, or the like.

At block 710, in at least one of the various embodiments, the data portions stored in the buffers may be written to the storage locations. In some embodiments, if the time period has elapsed, data portions in the buffer may be written to the storage location (e.g., stable storage). Likewise, if the size of the contents of a buffer exceed a defined threshold, the contents of the buffer may be written to the storage location. As described above, the data portions may be written to storage locations that correspond to the storage location identity provided in block 706.

At block 712, in at least one of the various embodiments, one or more write acknowledgement messages may be provided to the writer client that provided the journal data. In some embodiments, the acknowledgement message may indicate that the journal data provided by the client has reached stable storage in the journaling system. Next, control may be returned to a calling process.

FIG. 8 illustrates an overview flowchart for process 800 for writing journal data to storage locations that comprise a journaling system in accordance with at least one of the various embodiments. After a start block, at block 802, in at least one of the various embodiments, one or more data portions may be provided to a memory buffer that may be associated with a storage location. In some embodiments, each storage location may be arranged to have a dedicated hardware buffer. In other embodiments, buffers for more than one storage location may be provided using hardware memory that may be shared by more than one storage location.

In at least one of the various embodiments, a network file system application, such as, network file system application 322, and/or a storage management application, such as, storage management application 324, may be arranged to employ a sharding algorithm to allocate portions of journal data writes to a particular storage location. The sharding algorithm may provide an identity and/or index value that may correspond to a particular storage location in the journaling system. Accordingly, the buffer corresponding to the particular storage location may be used for storage the one or more data portions.

At decision block 804, in at least one of the various embodiments, if the contents of the write buffer exceed a data size threshold value, control may flow to block 808; otherwise, control may flow to decision block 806. As described above, a size limit may be defined for each buffer. Accordingly, if the number of data portions stored in the buffer exceeds the threshold, further actions may be executed to empty the contents of the buffer.

In at least one of the various embodiments, since each storage location may have a maximum single transaction write size (e.g., write block), the size threshold value may be defined such that it is aligned/consistent with the maximum single write size for the storage location. For example, the size threshold may be defined such that the physical sector size of the storage location. Also, in some embodiments, the size threshold value may be aligned and/or consistent with one or more features of the underlying operating system or file system, such as, cache block size, and so on.

At decision block 806, in at least one of the various embodiments, if a defined time period has expired, control may flow to block 808; otherwise, control may loop back to 802. As described above, a time period may be defined that establishes a time threshold for writing data portions from a buffer to the corresponding storage location. In at least one of the various embodiments, if the time threshold is reached the contents of the buffer may be stored on its corresponding storage location. Establishing a time threshold provides a guarantee that a data portion will not sit remain in the buffer beyond a certain time. Thus, in some embodiments, even if there is room in the buffer for more data portions, at the expiration of the defined time period, any data portions in the buffer will be stored in the buffer's corresponding storage location (e.g., into stable storage).

At block 808, in at least one of the various embodiments, one or more of the data portions in the memory buffer may be written to its associated storage location. In at least one of the various embodiments, each data portion in the buffer may be written to the buffer's corresponding storage location. Also, in some embodiments, the time period and contents size for the buffer may be reset to enable more data portions to be stored in the buffer.

At decision block 810, in at least one of the various embodiments, if there are more data portions for writing, control may loop back to block 806; otherwise, control may be returned to a calling process.

It will be understood that each block of the flowchart illustration, and combinations of blocks in the flowchart illustration, can be implemented by computer program instructions. These program instructions may be provided to one or more processors, including one or more special purpose processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the one or more processors to perform the operational steps shown in the blocks of the flowchart in parallel. Moreover, some of the steps may also be performed across more than one processor, such as might arise in a multi-processor computer system and/or multi-core hardware processor. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of actions for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of a CPU, such as, an Application Specific Integrated Circuit (ASIC), Field Programmable Gate Array (FPGA), Programmable Array Logic (PAL), or the like, or combination thereof. The one or more embedded logic hardware devices may directly execute embedded logic to perform actions described above. In at least one embodiment, one or more microcontrollers may be arranged to directly execute their own embedded logic to perform actions and access their own internal memory and their own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for storing data in a storage system over a network using a network computer that performs actions, comprising:
   providing a plurality of data portions from one or more blocks of write data, wherein the one or more blocks of write data are provided by one or more write-client computers;
   associating a storage location identifier with each data portion of the plurality of data portions based on at least a content of the each data portions;
   storing one or more data portions of the plurality of data portions in a memory buffer that corresponds to the storage location identifier that is associated with the one or more data portions;
   employing a determination that an amount of data stored in the memory buffer exceeds a memory buffer size threshold value to determine whether to store the one or more data portions on a storage location that corresponds to the memory buffer;

employing a maximum latency time that expires to determine whether to store the one or more data portions on the storage location that corresponds to the memory buffer, wherein the maximum latency time is selected to prevent a collision caused by simultaneously storing, in a single write operation, two or more data portions in the same storage location; and providing a write acknowledgement message to the one or more write-client computers, wherein the write acknowledgement message indicates that the one or more blocks of write data is stored on non-transitory computer readable storage media of the storage location.

2. The method of claim 1, further comprising, when the two or more data portions of the plurality of data portions are associated with a same storage location identifier, storing the two or more data portions in a single memory buffer that corresponds to the same storage location identifier.

3. The method claim 1, wherein storing the one or more data portions in the memory buffer on the storage location, further comprises, storing the one or more data portions to the storage location in a single write operation.

4. The method claim 1, wherein associating a storage location identifier with each data portion of the plurality of data portions, further comprises:
providing a hash key separately based on one or more portions of each data portion; and
providing the storage location identifier based on the hash key and a number of available storage locations.

5. The method of claim 1, further comprising, providing the memory buffer size threshold value based on a minimum write block size for the storage location that corresponds to the memory buffer.

6. The method of claim 1, wherein the plurality of data portions exceeds the number of memory buffers.

7. The method of claim 1, wherein the memory buffer and its corresponding storage location are located on separate network computers.

8. The method of claim 1, wherein the two or more data portions in the memory buffer are from different blocks of write data.

9. A system for storing data in a storage system over a network, comprising:
one or more client computers, comprising:
a transceiver that communicates over the network;
a memory that is arranged to store at least instructions; and
one or more processor devices that execute instructions that perform actions, including:
providing one or more blocks of write data to a network computer in a storage system; and
a network computer comprising:
a transceiver that communicates over the network;
a memory that is arranged to store at least instructions; and
one or more processor devices that execute instructions that perform actions, including:
providing a plurality of data portions from one or more blocks of write data, wherein the one or more blocks of write data are provided by the one or more client computers;
associating a storage location identifier with each data portion of the plurality of data portions based on at least a content of the each data portions;
storing one or more data portions of the plurality of data portions in a memory buffer that corresponds to the storage location identifier that is associated with the one or more data portions;
employing a determination that an amount of data stored in the memory buffer exceeds a memory buffer size threshold value to determine whether to store the one or more data portions on a storage location that corresponds to the memory buffer;
employing a maximum latency time that expires to determine whether to store the one or more data portions on the storage location that corresponds to the memory buffer, wherein the maximum latency time is selected to prevent a collision caused by simultaneously storing, in a single write operation, two or more data portions in the same storage location; and
providing a write acknowledgement message to the one or more write-client computers, wherein the write acknowledgement message indicates that the one or more blocks of write data is stored on the storage location.

10. The system of claim 9, wherein the one or more processor devices of the network computer execute instructions that perform actions, further comprising, when the two or more data portions of the plurality of data portions are associated with a same storage location identifier, storing the two or more data portions in a single memory buffer that corresponds to the same storage location identifier.

11. The system of claim 9, wherein storing the one or more data portions in the memory buffer on the storage location, further comprises, storing the one or more data portions to the storage location in a single write operation.

12. The system of claim 9, wherein associating a storage location identifier with each data portion of the plurality of data portions, further comprises:
providing a hash key separately based on one or more portions of each data portion; and
providing the storage location identifier based on the hash key and a number of available storage locations.

13. The system of claim 9, wherein the one or more processor devices of the network computer execute instructions that perform actions, further comprising, providing the memory buffer size threshold value based on a minimum write block size for the storage location that corresponds to the memory buffer.

14. The system of claim 9, wherein the plurality of data portions exceeds the number of memory buffers.

15. The system of claim 9, wherein the memory buffer and its corresponding storage location are located on separate network computers.

16. The system of claim 9, wherein the two or more data portions in the memory buffer are from different blocks of write data.

17. A processor readable non-transitory storage media that includes instructions for storing data in a storage system over a network, wherein execution of the instructions by one or more processor devices performs actions, comprising:
providing a plurality of data portions from one or more blocks of write data, wherein the one or more blocks of write data are provided by one or more write-client computers;
associating a storage location identifier with each data portion of the plurality of data portions based on at least a content of the each data portions;
storing one or more data portions of the plurality of data portions in a memory buffer that corresponds to the storage location identifier that is associated with the one or more data portions;

employing a determination that an amount of data stored in the memory buffer exceeds a memory buffer size threshold value to determine whether to store the one or more data portions on a storage location that corresponds to the memory buffer;

employing a maximum latency time that expires to determine whether to store the one or more data portions on the storage location that corresponds to the memory buffer, wherein the maximum latency time is selected to prevent a collision caused by simultaneously storing, in a single write operation, two or more data portions in the same storage location; and providing a write acknowledgement message to the one or more write-client computers, wherein the write acknowledgement message indicates that the one or more blocks of write data is stored on the storage location.

18. The media of claim 17, further comprising, when the two or more data portions of the plurality of data portions are associated with a same storage location identifier, storing the two or more data portions in a single memory buffer that corresponds to the same storage location identifier.

19. The media of claim 17, wherein storing the one or more data portions in the memory buffer on the storage location, further comprises, storing the one or more data portions to the storage location in a single write operation.

20. The media of claim 17, wherein associating a storage location identifier with each data portion of the plurality of data portions, further comprises:
providing a hash key separately based on one or more portions of each data portion; and
providing the storage locations identifier based on the hash key and a number of available storage locations.

21. The media of claim 17, further comprising, providing the memory buffer size threshold value based on a minimum write block size for the storage location that corresponds to the memory buffer.

22. The media of claim 17, wherein the plurality of data portions exceeds the number of memory buffers.

23. The media of claim 17, wherein the memory buffer and its corresponding storage location are located on separate network computers.

24. A network computer for storing data in a storage system over a network comprising:
a transceiver that communicates over the network;
a memory that is arranged to store at least instructions; and
one or more processor devices that execute instructions that perform actions, including:
providing a plurality of data portions from one or more blocks of write data, wherein the one or more blocks of write data are provided by one or more write-client computers;
associating a storage location identifier with each data portion of the plurality of data portions based on at least a content of the each data portions;
storing one or more data portions of the plurality of data portions in a memory buffer that corresponds to the storage location identifier that is associated with the one or more data portions;
employing a determination that an amount of data stored in the memory buffer exceeds a memory buffer size threshold value to determine whether to store the one or more data portions on a storage location that corresponds to the memory buffer;
employing a maximum latency time that expires to determine whether to store the one or more data portions on the storage location that corresponds to the memory buffer, wherein the maximum latency time is selected to prevent a collision caused by simultaneously storing, in a single write operation, two or more data portions in the same storage location; and
providing a write acknowledgement message to the one or more write-client computers, wherein the write acknowledgement message indicates that the one or more blocks of write data is stored on the storage location.

25. The network computer of claim 24, further comprising, when the two or more data portions of the plurality of data portions are associated with a same storage location identifier, storing the two or more data portions in a single memory buffer that corresponds to the same storage location identifier.

26. The network computer of claim 24, wherein storing the one or more data portions in the memory buffer on the storage location, further comprises, storing the one or more data portions to the storage location in a single write operation.

27. The network computer of claim 24, wherein associating a storage location identifier with each data portion of the plurality of data portions, further comprises:
providing a hash key separately based on one or more portions of each data portion; and
providing the storage location identifier based on the hash key and a number of available storage locations.

28. The network computer of claim 24, further comprising, providing the memory buffer size threshold value based on a minimum write block size for the storage location that corresponds to the memory buffer.

29. The network computer of claim 24, wherein the plurality of data portions exceeds the number of memory buffers.

30. The network computer of claim 24, wherein the memory buffer and its corresponding storage location are located on separate network computers.

* * * * *